Patented Nov. 23, 1926.

1,608,075

UNITED STATES PATENT OFFICE.

JOHAN HUGO WALLIN, OF DJURSHOLM, SWEDEN.

PROCESS OF DESTRUCTIVE DECOMPOSITION OF ORGANIC SUBSTANCES.

No Drawing. Application filed April 18, 1923, Serial No. 632,931, and in Sweden August 26, 1920.

The present invention refers to a method of producing from organic substances, for example, waste cellulose liquor, tar, phenols, wood (saw-dust etc.), straw, grass, leaves, peat, brown-coal etc., fish refuse etc., acids, oils, alcohols, aldehydes, ketones, amines, ammonia etc. The characteristics of the invention consist in that these substances are heated to a temperature of more than 250° C. and that the pressure be kept at least at the corresponding steam pressure, with an excess of a solution of caustic alkali (or a mixture of caustic alkali and carbonate of an alkali metal) the excess being such that it is capable of reacting with all the acids formed. The heating is preferably accomplished by pumping the solution through pipes or other devices wherein the hydrogen developed during the process comes into intimate contact with the solution or possibly an autoclave may be used. Alcohols, aldehydes, oils, amines, ketones etc. developed during the heating process are separated from the solution by distillation, after which the acids in some suitable manner are recovered from the remaining saline solution or the alcohols, aldehydes, oils, amines, etc. exhausted direct from the autoclave, these substances being easily volatilized.

The expression "organic substances" as used herein is intended to mean such substances as contain groups as indicated in the following reactions:

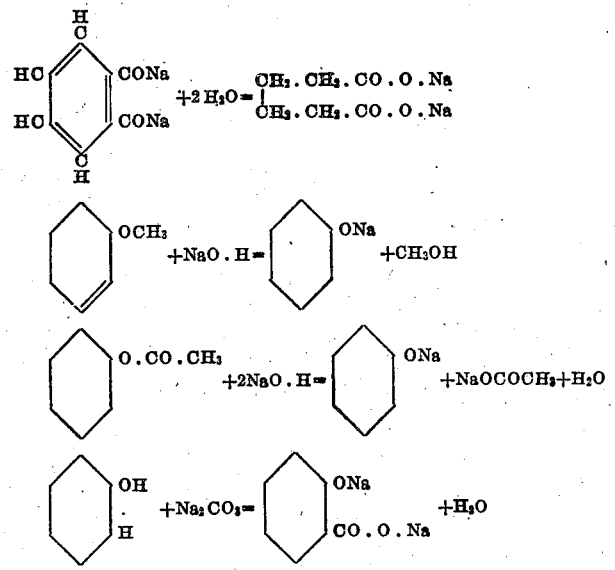

Cellulose and sugar+$H_2O$ will give certain organic salts.

combines with hydrogen more easily than common phenol.

Certain solid substances permit of their easily being dissolved at a comparatively low temperature in caustic soda solution, for example, wood (at about 180° C.), fish refuse, straw, grass, leaves, etc., and it may then be of advantage to make the solution in the course of preparatory operation at the said low temperature prior to the final decomposition. Other substances, like peat, contain such a large quantity of free acids that it may be of advantage to first heat with soda ($Na_2CO_3$) for neutralization. Liquid substances, such as tar, phenols, waste cellulose liquor or solutions obtained through preliminary solution in the manner described above, receive an admixture of a sufficient quantity of alkali, which may be ascertained by laboratory tests. Solid substances, like peat, saw dust, straw, lignites, brown-coal, fresh coal, fish refuse etc. (every possible kind of organic refuse), which are to be treated directly, are mixed in a very finely pulverized condition in a proper quantity of an alkali solution. The solutions or mixtures, as the case may be, obtained in any suitable manner are heated to a temperature of 250° to 600° C. and subjected to a pressure of 40 to 500 atmospheres while being pumped through a tubular system or some other suitable apparatus or in an autoclave. The quantity of alkali, shall as stated above, be such that it is able to react with all the acids formed during the process. The admixture of soda ($Na_2CO_3$) will probably form organic salts with existing or developed phenols. Generally, caustic alkali is regenerated from a preceding process by causticizing the dry distillation residue with lime, whereby a part of the sodium carbonate remains unchanged, so that the addition of sodium carbonate will be superfluous. The process is carried out in such a manner that the hydrogen developed will be added to the unsaturated organic salts formed, which are more easily hydrogenated than the original high-molecular substances. The higher —OH concentration in the alkali solution facilitates the addition of $H_2O$ to the high molecular substances and forms acids and other compounds of lesser molecular weight. The hydrogen results from the decomposition of the formates which are produced during the reaction.

Alcohols, aldehydes, some ketones, oils, and amines (ammonia) are distilled from the liquid reaction mixture. The nitrogen in the raw material is present in the exhaust gases (for example in the case of fish refuse in large quantities) and can be recovered, for instance by washing the gases with sulphuric acid, sulphate of ammonium, $(NH_4)_2.SO_4$, or sulphate of amines, for instance,

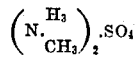

The organic salts formed may be utilized in various ways, for example by the well known method of heating the salts (dry distillation with or without steam) without the admixture of strong bases, when ketones are formed. Any substances insufficiently acted upon by the hydrogen (for example, phenols) possibly occurring among the products may, after the proper admixture of alkali, be reintroduced into the process with a new solution.

As examples of compounds which can be produced by means of this process may be mentioned acetone (dimethyl ketone), ethylmethyl-ketone, pentaphenol, methyl alcohol, sodium acetate, sodium adipate, etc.

What I claim is:

1. The method of destructively decomposing organic substances, which comprises heating the organic substances under pressure with a solution of caustic alkali, the alkali being in excess sufficiently great to react with all acids formed during the process, a temperature of not less than 250° C. and a pressure between 40 and 500 atmospheres being maintained.

2. The method of destructively decomposing organic substances, which comprises heating the organic substances under pressure with a solution of caustic alkali, the alkali being in excess sufficiently great to react with all acids formed during the process, a temperature of not less than 250° C. and a pressure between 40 and 500 atmospheres being maintained, distilling off the volatile products formed during the heating process, and treating the residual organic saline solution for recovering organic acids and ketones therefrom.

3. The method of destructively decomposing organic substances, which comprises pumping said substances under pressure together with a solution of caustic alkali through a heating system thereby to facilitate the action of any hydrogen formed during the process, the alkali being in excess sufficiently great to react with all acids formed during the process, a temperature of not less than 250° C. and a pressure of at least 40 atmospheres being maintained.

4. The method of destructively decomposing organic substances, which comprises dissolving said substances in caustic alkali, and heating under pressure, together with a solution of caustic alkali, the alkali being in excess sufficiently great to react with all acids formed during the process, a temperature of not less than 250° C. and a pressure of not less than 40 atmospheres being maintained.

5. The method of destructively decomposing organic substances, which comprises heating the organic substances under pressure with a solution of caustic alkali, the alkali being in excess sufficiently great to react with all acids formed during the process, a temperature of not less than 250° C. and a pressure between 40 and 500 atmospheres being maintained, evaporating the remaining solution, and dry-distilling the residual organic acid salts thereby to recover additional volatile products.

In testimony whereof I have signed my name to this specification.

JOHAN HUGO WALLIN.